United States Patent
Notaro et al.

(12) 
(10) Patent No.: US 6,230,737 B1
(45) Date of Patent: May 15, 2001

(54) CYLINDER VALVE ASSEMBLY

(75) Inventors: John Notaro, West Seneca; Thomas Edward Debriae, Orchard Park, both of NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 08/947,940

(22) Filed: Oct. 9, 1997

Related U.S. Application Data

(63) Continuation-in-part of application No. 08/554,176, filed on Nov. 6, 1995.

(51) Int. Cl.[7] ......................... F16K 15/18; F16K 17/168; F17C 13/04
(52) U.S. Cl. ................... 137/329.4; 137/614.19; 137/614.2; 137/68.19
(58) Field of Search ............... 137/329.1, 329.2, 137/329.3, 329.4, 614.05, 614.2, 614.21, 322, 68.19, 614.19

(56) References Cited

U.S. PATENT DOCUMENTS

| | | | |
|---|---|---|---|
| 880,786 | * 3/1908 | Finnegan | 137/329.1 |
| 1,226,175 | * 5/1917 | Bibleheiser, Jr. | 137/329.1 |
| 1,441,987 | * 1/1923 | Lee | 137/329.4 |
| 1,645,156 | * 10/1927 | Rowe | 137/329.1 |
| 2,461,940 | * 2/1949 | Sundstrom | 137/329.4 |
| 3,930,517 | * 1/1976 | Gagala | 137/329.4 |
| 4,033,378 | 7/1977 | Pauliukonis | 137/614.19 |
| 4,123,089 | 10/1978 | Viero et al. | 285/39 |
| 4,527,587 | 7/1985 | Fairlamb | 137/329.3 |
| 4,562,852 | 1/1986 | Britt | 137/68.1 |
| 4,562,856 | 1/1986 | Garvey et al. | 137/329.3 |
| 4,606,367 | 8/1986 | Britt | 137/15 |
| 4,844,111 | 7/1989 | Pritchard et al. | 137/71 |
| 4,850,387 | 7/1989 | Bassill | 137/212 |
| 4,905,723 | 3/1990 | Pritchard et al. | 137/71 |
| 4,909,269 | 3/1990 | Pritchard et al. | 137/71 |
| 5,022,423 | 6/1991 | Britt | 137/68.1 |
| 5,036,878 | 8/1991 | Fournillon et al. | 137/493.9 |
| 5,048,565 | 9/1991 | Oi | 137/614.19 |
| 5,127,436 | 7/1992 | Campion et al. | 137/614.11 |
| 5,465,754 | 11/1995 | Sudo et al. | 137/614.2 |
| 5,787,921 | * 8/1998 | Kryger | 137/614.2 |

* cited by examiner

*Primary Examiner*—George L. Walton
(74) *Attorney, Agent, or Firm*—Stanley Ktorides

(57) ABSTRACT

A cylinder valve assembly having a check valve in a sealing assembly attached to a cylinder, and a detachable dispensing valve matingly fitted with the sealing assembly which actuates the check valve when seated.

1 Claim, 3 Drawing Sheets

CYLINDER VALVE ASSEMBLY

This is a Continuation-in-Part of prior U.S. application Ser. No. 08/554,176 Filing Date: Nov. 6, 1995.

TECHNICAL FIELD

The present invention relates generally to cylinders for storing, transporting and dispensing fluids such as compressed gases, and more particularly, to valve assemblies for such cylinders.

BACKGROUND ART

High pressure cylinders are used widely to transport and dispense large quantities of various industrial gases. Such cylinders can be used individually or manifolded to supply the user's gas requirements.

Presently, high pressure cylinders are fitted with multi-purpose valve systems. The valve systems are suitable to charge the cylinder with gas. The valve systems are also suitable to dispense gas from the cylinder. In addition, the valve systems are suitable to act as a shut-off device to stop the dispensing of gas. And, moreover, the valve systems also serve a safety function to prevent excessive pressure rise through a pressure-sensitive cap or the like.

While every charged fluid cylinder requires attachment of a valve system at all times (at least to provide a safety and shut-off mechanism), it is not necessary that every gas cylinder have a multi-function valve system at all times. The additional features (such as pressure-reducing stage, residual product check devices or even dispensing or charging elements) create an added expense, which is not necessary during transport, handling and storing of gas cylinders.

Besides cost considerations, such conventional multi-function valve systems protrude above the gas cylinder and are therefore susceptible to deformation and/or breakage, particularly during cylinder mishandling (e.g., tip over). The result of such deformation and/or breakage may be waste of gas product, or worse yet the escape of unsafe gas product into the environment.

It is therefore an object of the invention to provide a cylinder valve assembly which will enable a cylinder to be transported from a charging station to a dispensing station without a dispensing valve.

SUMMARY OF THE INVENTION

The above and other objects, which will become apparent to one skilled in the art upon a reading of this disclosure, are attained by the present invention, which is:

A cylinder valve assembly comprising:
 (A) a cylinder;
 (B) a sealing assembly attached to the cylinder, said sealing assembly having a threaded receiver communicating with an engaging passage, and a check valve having a check valve stem extending into said engaging passage; and
 (C) a detachable dispensing valve threaded within the receiver having a dispensing valve stem extending into said engaging passage and sized to contact the check valve stem within the engaging passage when the detachable dispensing valve is seated in the receiver.

As used herein the term "check valve" means a valve biased in the closed position.

As used herein the term "dispensing valve" means an unbiased valve which can be opened or closed.

As used herein the term "seated" means screwed to a tight fit.

BBRIEF DESCRIPTION OF THE DRAWINGS

The numerals in the Figures correspond for the common elements.

DETAILED DESCRIPTION

The present invention provides a cylinder valve assembly which will be described in detail hereinafter with reference to the Figures. Though the present invention may be practiced with a variety of fluids, the invention is preferably practiced with industrial gases, such as compressed air, carbon dioxide, nitrogen, helium, oxygen, argon and mixtures thereof, and the like.

Figure 1:
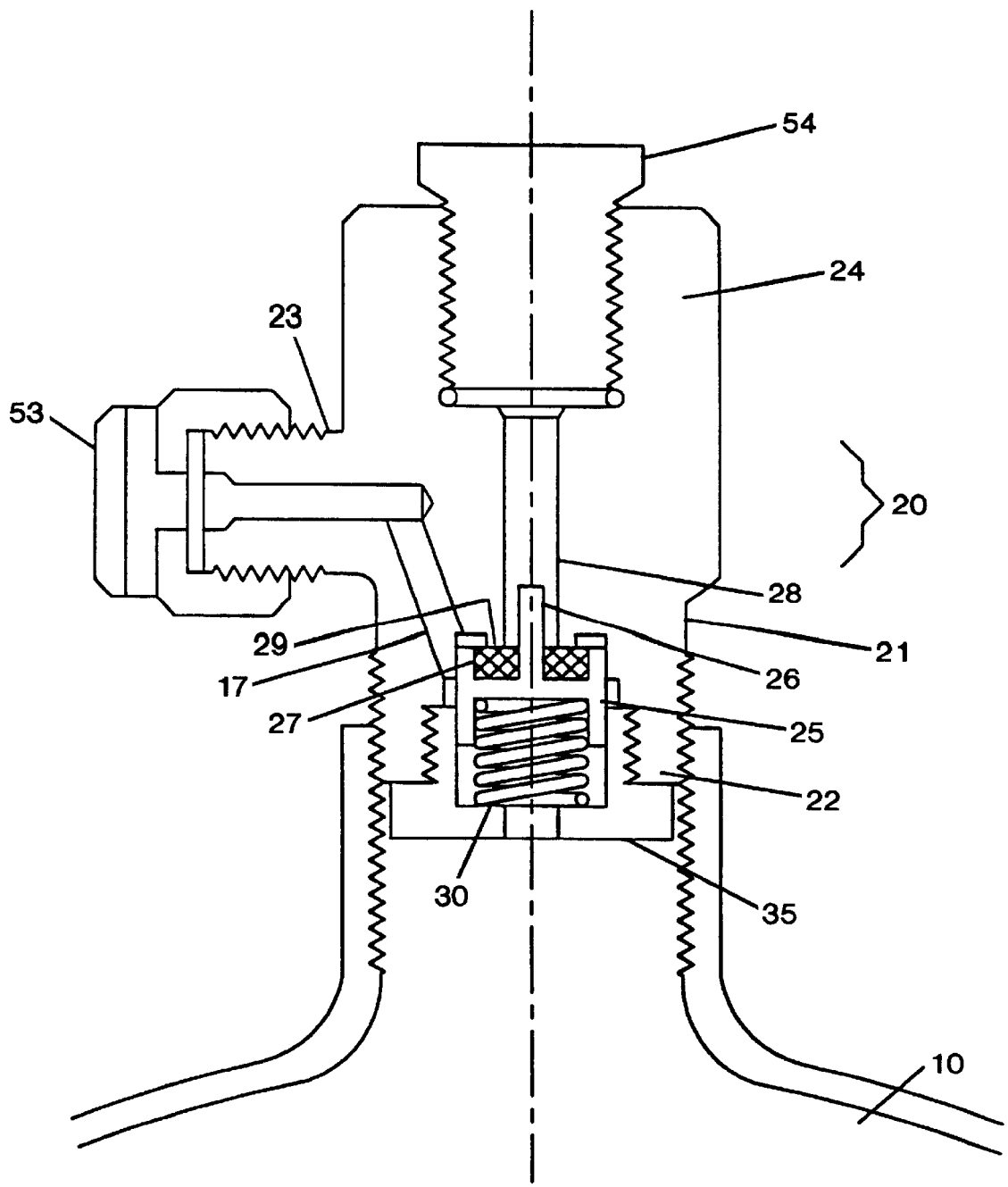
FIG. 1 depicts a sealing assembly according to the present invention attached to a gas cylinder, shown in partial cross-section.

FIG. 1 shows the sealing assembly 20 of the present invention, which comprises a check valve body 21. The check valve body 21 is constructed of a suitable material, such as brass, stainless steel, and the like, and is capable of withstanding high pressure from within the fluid cylinder 10.

The check valve body 21 includes a joining portion 22 for joining the valve body 21 to the fluid cylinder 10. The joining portion 22 may be externally threaded so as to be received by complementary internal threading from within an opening in the fluid cylinder 10. When the joining portion 22 is received by the opening in the fluid cylinder 10, the opening is closed and sealed.

The check valve body 21 also includes a pressure-sensitive safety device 23 which is in fluid communication with the cylinder fluid via the cylindrical channel 17, which is bored through the check valve body 21. The safety device 23 ensures safety to the user, particularly against the build-up of over pressure within the cylinder which may lead to a forceful discharge of the cylinder contents. The safety cap 53 (sometimes referred to as a bursting disc) ensures the escape of gas from the cylinder above predetermined pressure levels.

The check valve body 21 further includes a threaded receiver 24, which is disposed on the check valve body 21 at a location opposite to the joining portion 22 and communicates with engaging passage 28 within sealing assembly 20. A stop plug 54 is placed in the threaded receiver 24 to prevent contamination when a detachable dispensing valve is not attached thereto. The stop plug 54 can also act as a safety mechanism, such as a positive seal-off mechanism, during cylinder transport, handling or storage. The stop plug 54 may be constructed from a variety of materials, including metals and plastics, and may be externally threaded so as to be received by the complementary internal threading within the threaded receiver 24.

Because no dispensing valve is present on the sealing assembly attached to cylinders which are not in use, there is less opportunity for mechanical damage or breakage due to cylinder mishandling. Thus, the cylinder does not require a protective cap of a conventional cylinder assembly.

Figure 2:
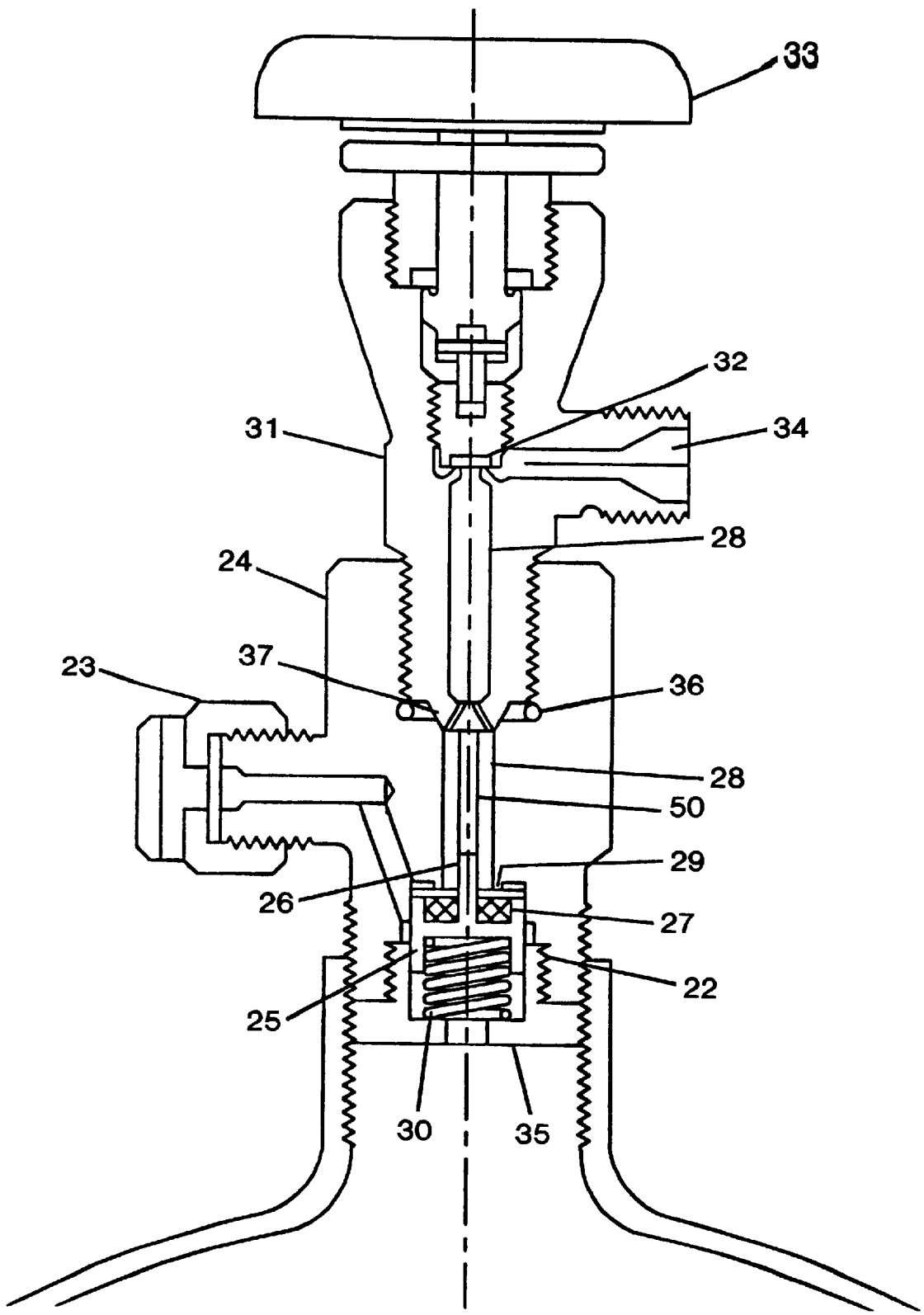
FIG. 2 depicts the sealing assembly shown in FIG. 1, to which is attached a detachable dispensing valve.
Figure 3:
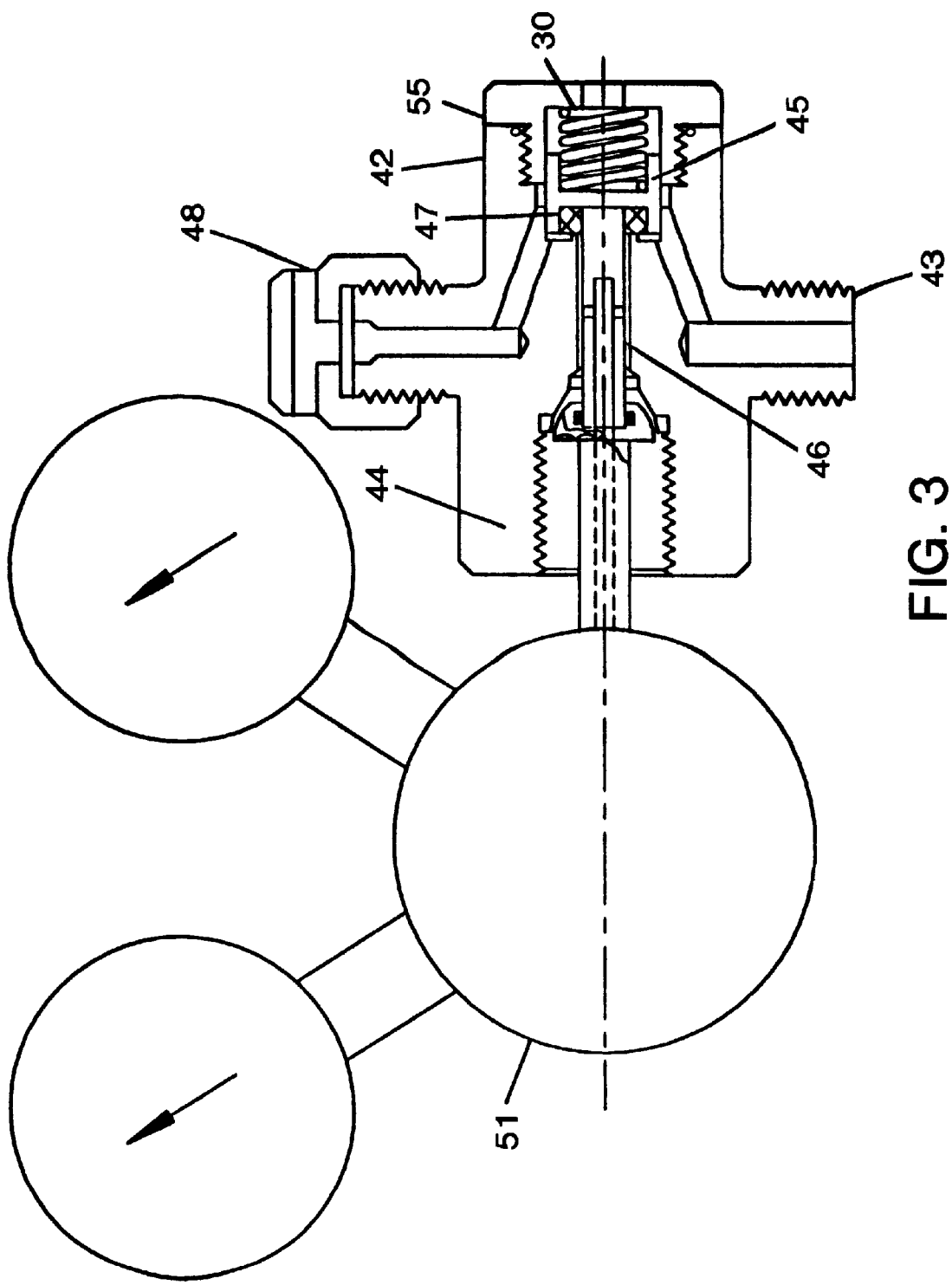
FIG. 3 depicts another sealing assembly according to this invention, shown in partial cross-section.

In one embodiment of this invention shown in FIG. 1, the joining portion 22 contains a check valve, such as a spring biased check valve 25 in which is placed seal 27, to prevent fluid flow. In an alternative embodiment of this invention shown in FIG. 3, a spring biased check valve 45 is disposed in sealing assembly 42, located adjacent and often approximately perpendicular to the joining portion 43. In the embodiment of FIG. 3, the outlet 44 is configured the same as the outlet of the dispensing valve 34 shown in FIG. 2. In this configuration the pressure regulator 51 can be directly attached eliminating the need for an intermediary dispensing valve altogether.

The spring biased check valve acts to prevent the escape of product gas from the cylinder. The spring biased check valve also permits a cylinder charging lead to perform its intended function during the cylinder charging operation. In addition, when the cylinder is placed in use, the spring biased check valve is actuated when the dispensing valve of FIG. 2 or the regulator of FIG. 3 is attached to the sealing assembly, thereby permitting product gas to be withdrawn from the cylinder.

The spring biased check valve 25 includes a check valve stem 26 which extends into engaging passage 28 passing through the check valve body 21. In FIGS. 1 and 2, for instance, the engaging passage follows an axis of the check valve body, which is a vertical axis concentric with the vertical axis of the cylinder; in FIG. 3, the cylindrical engaging passage follows an axis of the check valve body, which is a horizontal axis. The check valve stem 26 protrudes through a seat 29, which, when in the closed or sealed position, abuts one surface of the seal 27. Disposed on the opposite surface of the seal 27 is the sealing means which includes a spring 30. Other sealing arrangements which may be employed in connection with the spring biased check valve include a plug, such as a metal plug (constructed of, for instance, brass) on a soft seat (constructed of, for instance, teflon or Kel-F), 0-ring seals, elastomeric discs, a flat washer on a seat, such as a metal seat, and the like. Joining portion 22 also includes a spring enclosure element 35 which abuts spring 30 and maintains spring 30 and retainer 25 in place. In FIG. 3 the spring enclosure element is shown as element 55 in sealing assembly 42.

In the check valve body 21, the seal 27 is forced by means of the spring 30 and the pressure exerted by the product gas in the cylinder against the seat 29, thereby providing a positive seal. The seal 27 fits into a recess of the check valve 25, resulting in a seal which withstands the high pressures and flow rates from the cylinder and exhibiting good compression strength and sealing characteristics.

The threaded receiver 24 is capable of receiving a detachable dispensing valve. In FIG. 2, such a detachable dispensing valve 31 is joined to the receiver 24, and fluid communication is established with the joining portion 22 via the engaging channel 28. In one embodiment, the receiver 24 is disposed on the check valve body at a location opposite to the joining portion 22 and in fluid communication therewith as shown in FIGS. 1 and 2. In an alternative embodiment, the threaded receiver 44 is disposed on the check valve body 41 at a location opposite a sealing assembly 42, such as approximately perpendicular to the joining portion 43 as shown in FIG. 3.

As shown in FIG. 3, the receiver 44 is disposed approximately perpendicular to the joining portion 43, which itself is disposed approximately perpendicular to the sealing assembly 42. As shown in FIG. 3, receiver 44 is joined with the connection end 46 of a detachable dispensing valve or regulator. The pressure sensitive safety cap portion is shown in FIG. 3 as component 48 and the spring-biased check valve is shown as element 45. Spring enclosure 55 maintains check valve 45 and spring 30 in place.

When a detachable dispensing valve 31 as shown in FIG. 2 is seated in receiver 24, the check valve 25 is actuated by dispensing valve stem 50 contacting check valve stem 28 within engaging passage 28, thus depressing stem 26 and separating seal 27 from the seat 29. Dispensing valve stem 50 is sized so that it contacts check valve stem 26 when dispensing valve 31 is seated in receiver 24. The seat 29, as seen in FIG. 2, is a flat surface against which the seal 27 ordinarily abuts. However, when the check valve 25 is actuated, the seal 27 is displaced from its ordinarily abutting arrangement with the seat 29, thereby permitting the flow of gas.

Thus, as check valve 25 actuation occurs, gas can flow from the cylinder 10 and through engaging passage 28 within the detached dispensing valve 31, stopping at a seat 32. Seat 32 becomes actuated only upon opening the valve handle 33, which as shown in FIG. 2, is attached to detachable dispensing valve 31 through conventional threaded connections. The flow of gas may be regulated by the degree to which the valve handle 33 of detachable dispensing valve 31 is opened.

In FIG. 2, the valve handle 33 is capable of dispensing gas from the cylinder 10, regulating the flow of product gas and stopping the flow of product gas therefrom. In accordance with this invention, the user may dispense the gas from the gas cylinder 10 by turning the valve handle 33 to an open position.

Dispensing of the gas occurs through a distribution connection 34. The distribution connection 34 is shown with external threading to which may be attached appropriate distribution means (not shown) having complementary internal threading.

When gas dispensing is no longer required, the detachable dispensing valve is detached from the sealing assembly. In the detaching process, the dispensing valve is detached from the sealing assembly and in so doing, the seal 27 of check valve 25 again abuts the seat 29 so as to retain any residual product gas within the cylinder 10. The seal so formed also prevents inadvertent atmospheric contamination.

With reference to FIG. 3, the spring biased check valve 25 prevents the escape of product gas from the cylinder. When the detachable dispensing valve 31 is seated in the threaded receiver 24, a seal 36 is formed by the dispensing valve 31 against the flat surface 37 of the interior of the threaded receiver 24. Gas is permitted to enter the sealing assembly 21 upon attachment of the dispensing valve 31.

Though a dispensing valve is required to dispense product gas from the cylinder, prior to placing the cylinder in use no dispensing valve is necessary. As such, the number of element functions for the valve system required is reduced and the number of dispensing valves is also reduced. When a gas cylinder is to be placed in use, a dispensing valve is joined to the sealing assembly by seating it in the receiver. As such, the number of dispensing valves required in a gas package system is also reduced. The present invention therefore simplifies the cylinder package, more particularly the valving requirements, during transport, handling or storage.

Specific features of the invention are shown in one or more of the figures for convenience only, as each feature may be combined with other features in accordance with the invention. Alternative embodiments will be recognized by those skilled in the art and are intended to be included within the scope of the claims.

What is claimed is:

1. A cylinder valve assembly comprising:

(A) a cylinder;

(B) a sealing assembly having a check valve body attached to the cylinder, said sealing assembly having a threaded receiver communicating with an engaging passage, and a check valve having a recess and a seal which fits within the recess and which abuts a seat, said check valve also having a check valve stem which protrudes through the seal and the seat and which extends into said engaging passage;

(C) a detachable dispensing valve threaded within the receiver having a dispensing valve stem extending into said engaging passage and sized to contact the check valve stem within the engaging passage when the detachable dispensing valve is seated in the receiver; and (D) a pressure sensitive safety device in fluid communication with the cylinder via a channel passing through the check valve body to the check valve, wherein said channel is a separate passage outside of the engaging passage and is always open to the pressure sensitive safety device irregardless to the valving position of the check valve.

* * * * *